United States Patent
Shah et al.

[11] Patent Number: 6,026,345
[45] Date of Patent: *Feb. 15, 2000

[54] METHOD AND APPARATUS FOR TRACKING VEHICLE LOCATION

[75] Inventors: Mukesh Chamanial Shah, Lake Oswego, Oreg.; Sanjiv Prabhakaran, San Jose, Calif.

[73] Assignee: Mobile Information Systems, Inc., Sunnyvale, Calif.

[*] Notice: This patent is subject to a terminal disclaimer.

[21] Appl. No.: 09/158,039

[22] Filed: Sep. 21, 1998

Related U.S. Application Data

[63] Continuation of application No. 08/954,301, Oct. 20, 1997, Pat. No. 5,884,216, which is a continuation of application No. 08/443,063, May 19, 1995, Pat. No. 5,758,313, which is a continuation-in-part of application No. 07/961,736, Oct. 16, 1992, Pat. No. 5,428,546.

[51] Int. Cl.[7] .............................. G08G 1/13; G01S 7/10; G06F 17/60
[52] U.S. Cl. .......................... 701/117; 701/208; 340/995
[58] Field of Search .................................. 701/208, 117; 340/990, 995, 991; 707/100, 104

[56] References Cited

U.S. PATENT DOCUMENTS

| | | |
|---|---|---|
| 3,845,289 | 10/1974 | French . |
| 4,360,876 | 11/1982 | Girault et al. . |
| 4,513,377 | 4/1985 | Hasebe et al. . |
| 4,570,227 | 2/1986 | Tachi et al. . |
| 4,608,656 | 8/1986 | Tanaka et al. . |
| 4,611,293 | 9/1986 | Hatch et al. . |
| 4,613,913 | 9/1986 | Phillips . |
| 4,630,209 | 12/1986 | Saito et al. . |
| 4,660,037 | 4/1987 | Nakamura et al. . |
| 4,672,565 | 6/1987 | Kuno et al. . |
| 4,673,878 | 6/1987 | Tsushima et al. . |
| 4,675,676 | 6/1987 | Takanabe et al. . |
| 4,723,218 | 2/1988 | Hasebe et al. . |
| 4,734,863 | 3/1988 | Honey et al. . |
| 4,737,916 | 4/1988 | Ogawa et al. . |
| 4,751,512 | 6/1988 | Longaker . |
| 4,782,447 | 11/1988 | Ueno et al. . |
| 4,788,645 | 11/1988 | Zavoli et al. . |
| 4,796,191 | 1/1989 | Honey et al. . |
| 4,797,841 | 1/1989 | Hatch . |
| 4,831,563 | 5/1989 | Ando et al. . |
| 4,862,398 | 8/1989 | Shimizu et al. . |
| 4,873,513 | 10/1989 | Soults et al. . |
| 4,891,650 | 1/1990 | Sheffer ..................................... 342/457 |
| 4,914,605 | 4/1990 | Loughmiller, Jr. et al. . |
| 4,918,609 | 4/1990 | Yamawaki . |

(List continued on next page.)

OTHER PUBLICATIONS

Allen, David P., "Here Be Dragons . . . ," *CD–ROM EndUser*, Mar. 1990.

French, R.L., "MAP Matching Origins Approaches and Applications," Robert L. French & Associates, 3815 Lisbon Street, Suite 201, Fort Worth, Texas 76107, pp. 91–116.

Sena, Michael L., "Computer–Aided Dispatching," *Computer Graphics World*, PennWell (publ.), May 1990.

*Primary Examiner*—Michael J. Zanelli
*Attorney, Agent, or Firm*—Townsend and Townsend and Crew LLP

[57] ABSTRACT

A method computer aided dispatching. The present method includes providing a display 510 having a first display segment 530. The first display segment 530 includes a digitized representation of a selected area from a raster map, intelligent area data superimposed upon the selected area to provide intelligence, and a user locatable mark 520. The user locatable mark 520 defines a mobile unit position based upon a first value and a second value. The present method also includes using a dispatch system 811 operably coupled to the display. The dispatch system 811 includes order data from customers. A portion of the order data is transferred from a data acquisition 801, 808 device to the mobile unit 610.

8 Claims, 10 Drawing Sheets

U.S. PATENT DOCUMENTS

| | | |
|---|---|---|
| 4,924,402 | 5/1990 | Ando et al. . |
| 4,926,336 | 5/1990 | Yamada . |
| 4,937,753 | 6/1990 | Yamada . |
| 4,954,959 | 9/1990 | Moroto et al. . |
| 4,964,052 | 10/1990 | Ohe . |
| 4,970,652 | 11/1990 | Nagashima . |
| 4,982,332 | 1/1991 | Saito et al. . |
| 4,984,168 | 1/1991 | Neukrichner et al. . |
| 4,989,151 | 1/1991 | Nuimura . |
| 4,992,947 | 2/1991 | Nuimura et al. . |
| 4,996,645 | 2/1991 | Schneyderberg Van der Zon . |
| 4,999,783 | 3/1991 | Tenomoku et al. . |
| 5,003,317 | 3/1991 | Gray et al. . |
| 5,040,122 | 8/1991 | Neukirchner et al. . |
| 5,046,011 | 9/1991 | Kakihara et al. . |
| 5,060,162 | 10/1991 | Ueyama et al. . |
| 5,067,081 | 11/1991 | Person . |
| 5,109,399 | 4/1992 | Thompson . |
| 5,122,959 | 6/1992 | Nathanson et al. . |
| 5,140,532 | 8/1992 | Beckwith, Jr. et al. . |
| 5,155,689 | 10/1992 | Wortham ................................ 364/460 |
| 5,177,685 | 1/1993 | Davis et al. . |
| 5,222,690 | 6/1993 | Jeffords . |
| 5,243,530 | 9/1993 | Stanifer et al. . |
| 5,272,638 | 12/1993 | Martin et al. . |
| 5,283,743 | 2/1994 | Odagawa . |
| 5,287,297 | 2/1994 | Thara et al. . |
| 5,297,049 | 3/1994 | Gurmu et al. . |
| 5,297,050 | 3/1994 | Ichimura et al. . |
| 5,311,195 | 5/1994 | Mathis et al. . |
| 5,334,974 | 8/1994 | Simms et al. . |
| 5,428,546 | 6/1995 | Shah et al. . |
| 5,434,788 | 7/1995 | Seymour et al. . |
| 5,470,233 | 11/1995 | Fruchterman et al. . |
| 5,485,161 | 1/1996 | Vaughn . |
| 5,487,139 | 1/1996 | Saylor et al. . |
| 5,604,676 | 2/1997 | Penzias . |

METHOD AND APPARATUS FOR TRACKING VEHICLE LOCATION

CROSS-REFERENCE TO RELATED APPLICATIONS

This application is a continuation of U.S. patent application Ser. No. 08/954,301, filed Oct. 20, 1997, which is a continuation of U.S. patent application Ser. No. 08/443,063, filed May 17, 1995, now U.S. Pat. No. 5,758,313, issued May 26, 1998, which is a continuation-in-part of U.S. patent application Ser. No. 07/961,736, filed Oct. 16, 1992, now U.S. Pat. No. 5,428,546, issued Jun. 27, 1995, the disclosures of which are incorporated herein by reference. This application is also related to U.S. patent application Ser. No. 08/443,062, filed May 17, 1995, now U.S. Pat. No. 5,636,122, issued Jun. 3, 1997.

BACKGROUND OF THE INVENTION

The present invention relates to a system for fleet management. The present invention is illustrated as an example with regard to a method and apparatus for presenting locations of a fleet of vehicles to a fleet manager by way of a display, but it will be recognized that the invention has a wider range of applicability. Merely by way of example, the invention can be applied to other types of uses with transportation, mapping, and the like.

In the fleet management business, knowledge of vehicle location is a powerful tool for the manager or dispatcher to efficiently operate the fleet. Assimilating the locations of the fleet as quickly as possible is important for efficient decision making. Various navigational systems, including the LORAN system and the global positioning system (GPS), are used to determine vehicle location. Both the LORAN and the GPS navigation systems rely on externally transmitted radio frequency signals to determine the location of a receiving antenna mounted on the vehicle. The vehicle position is defined in terms of a latitude and longitude value.

In order for the latitude and longitude values to be easily utilized by the dispatcher, latitude and longitude information is typically displayed in a map format. The two most common map formats for displaying vehicle position are 1) a raster map and 2) a vector map display. FIG. 1 illustrates a raster map display. A raster map is a digitized version of the type of road maps or paper maps most dispatchers are familiar with. A raster map is formed by digitally scanning a standard road map or paper map. Like the standard road map, raster maps typically contain visual features, such as natural and man-made features of the land, contour lines featuring shape and elevation and specific features such as roads, towns, water areas and vegetation.

One prior art raster display system is the MapStation developed by Spatial Data Sciences. MapStation is capable of displaying an icon representative of vehicle position moving along a raster map as the vehicle changes its latitude or longitude. Since the latitudinal and longitudinal position of the icon corresponds to a street location, the icon moves along a particular street on the raster map display. Because the raster map is merely a digitized representation of the street, no interrelationship between different street locations or landmarks exists. Thus, although the MapStation can display latitude and longitude information, it cannot display intelligent street information such as the particular street the vehicle is traveling on or the proximity of the vehicle to a particular street or landmark.

FIG. 2 shows a block diagram of a prior art raster map display system 200 which includes a mobile position database 210, a mobile position utility library 212, a raster database 214, a raster map utility library 216, an interface utility library 218, and a raster display 220. The mobile position library 212 contains routines which access the mobile database 210 retrieving vehicle identification, latitude and longitude information. The latitude and longitude values of the vehicle are transmitted to the raster utility 216 via bus 222. In response, the raster utility 216 accesses the raster database 214 and extracts a latitude and longitude value for the particular vehicle. The latitude, longitude and vehicle identification values are passed to the interface utility 218 where they are used for display of an icon on the raster display 220. In addition, the raster utility 216 extracts digitized information for a defined area based on the fleet location and zoom level for display as a raster map on the raster display 220.

FIG. 3 illustrates a vector map display. FIG. 4 illustrates a block diagram of the display system for implementing the vector map display shown in FIG. 3. Unlike the raster map database shown in FIG. 2, the vector map database 414 contains intelligent street and address information that provides the computer with the capability to identify the address of a vehicle location. The address information could consist of the block number, street name, county information. The vector display is generated in a similar manner to the raster display previously discussed. Streets in the vector map database 414 are defined in terms of segments. Segments are interconnected so that streets are interrelated to each other.

However, although the vector map contains street information, it does not contain visual features. Thus, information such as natural features of the land, contour lines featuring shape and elevation and specific features such as towns, water areas and vegetation which are typically displayed on a raster map are not shown on a vector display map.

Because visual features are so important to the dispatcher, one vector map display system created by Etak Corporation has tried to simulate the visual features such as landmarks commonly found in raster type display systems. The Etak system creates a stick-like outline of the landmark. Although the landmark is represented, the quality of the representation is inferior to the representation of the raster display.

Assimilating vehicle location as quickly as possible for efficient decision making is of prime importance. The majority of users are familiar with the road-map type display of raster displays and prefer digitized raster maps for being able to quickly recognize vehicle position. Because raster maps include geographic landmarks and visual features not found in the stick-like interconnection presented by vector maps, it is often easier to find or to designate a vehicle position. Additionally, users are accustomed to describing vehicle location as being a certain distance from a school, building or other landmark. However, although users are often more comfortable determining vehicle position using a raster map, raster maps are incapable of providing intelligent street information valuable in decision making. For example, a dispatcher would not be provided with information related to the distance between the current vehicle position and the vehicle destination using information provided by a raster data display system.

A further limitation with the aforementioned systems is a lack of computer aided dispatching. In fact, conventional computer aided dispatching often relies upon conventional two-way radios to provide communication between a dispatcher and a courier. The conventional two-way radio simply lacks the capability without substantial effort by a driver to continuously relate location, time, pick-up, and delivery information. The conventional two-way radio often causes inefficiencies in voice transfer and lacks data transfer.

As a result of the foregoing shortcomings, an integrated system for providing a raster map display which also provides intelligent address information and computer aided dispatching is needed.

SUMMARY OF THE INVENTION

According to the present invention, an integrated system which displays a raster map and vectorized street information corresponding to a vehicle position operably coupled to a computer aided dispatch system is provided. The present system provides an easy to view display with easy to use computer aided dispatch system for fleet management and the like applications.

In a specific embodiment, the present invention provides a computer aided dispatching method. The present method includes providing a display having a first display segment and a second display segment. The first display segment includes a digitized representation of a raster map and a plurality of user locatable marks. Each of the plurality of user locatable marks represents one of a plurality of mobile units at a mobile unit position. The second display segment includes vector text information for each of the plurality of mobile units. A step of using a computer aided dispatch system operably coupled to the display is also included. The computer aided dispatch system includes order data from customers. A portion of the order data is transferred from a data acquisition device to a radio in one of the plurality of mobile units.

An alternative specific embodiment provides a method for computer aided dispatching. The present method includes providing a display having a first display segment. The first display segment includes a digitized representation of a selected area from a raster map, intelligent area data superimposed upon the selected area to provide intelligence, and a user locatable mark. The user locatable mark defines a mobile unit position based upon a first value and a second value. A step of using a dispatch system operably coupled to the display is also included. The dispatch system includes order data from customers. A portion of the order data is transferred from a data acquisition device to the mobile unit.

A further specific embodiment provides a method of using a computer aided dispatch apparatus. The present method includes providing a display having a first display segment. The first display segment includes a digitized representation of a raster map, and the first display segment further includes intelligent street data. The present method also includes displaying a user locatable mark onto the digitized representation. The user locatable mark defines a mobile unit location having a first value and a second value. The mobile unit location corresponds to a mobile unit. A step of using a computer dispatch system operably coupled to the first display segment to provide an order to the mobile unit is also included.

A further understanding of the nature and advantages of the present invention may be realized by reference to the latter portions of the specification and attached drawings.

BRIEF DESCRIPTION OF THE DRAWINGS

The novel features characteristic of the invention are set forth in the appended claims. The invention, however, as well as other features and advantages thereof, will be best understood by reference to the detailed description which follows, when read in conjunction with the accompanying drawings, wherein:

DESCRIPTION OF THE SPECIFIC EMBODIMENT

In accordance with the present invention, an integrated system for simultaneously displaying a user locatable mark representative of a vehicle position on a raster map on a first display segment and intelligent street information on a second display segment is provided. The integrated system extracts information from the mobile position, vector and raster databases, interrelates the database information by a common vehicle position information, and displays the information in a format which can be easily utilized by the dispatcher.

Figure 1:
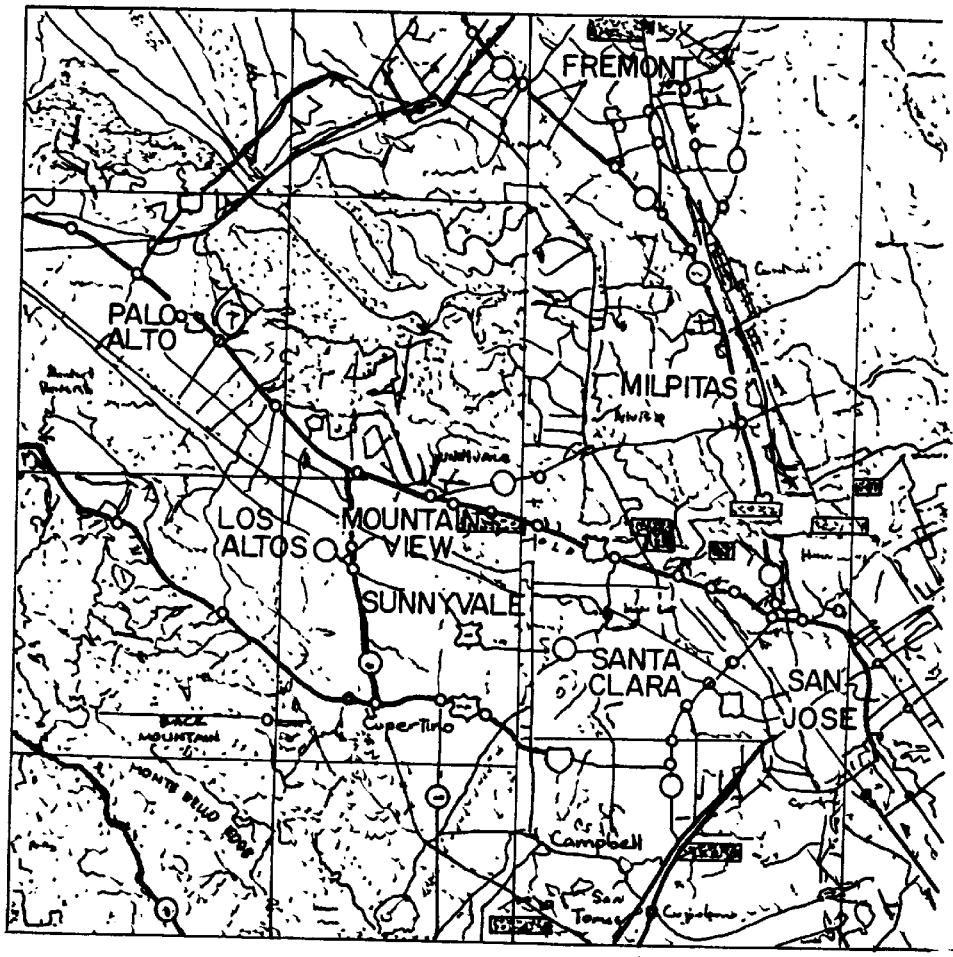
FIG. 1 illustrates a raster map display.
Figure 2:
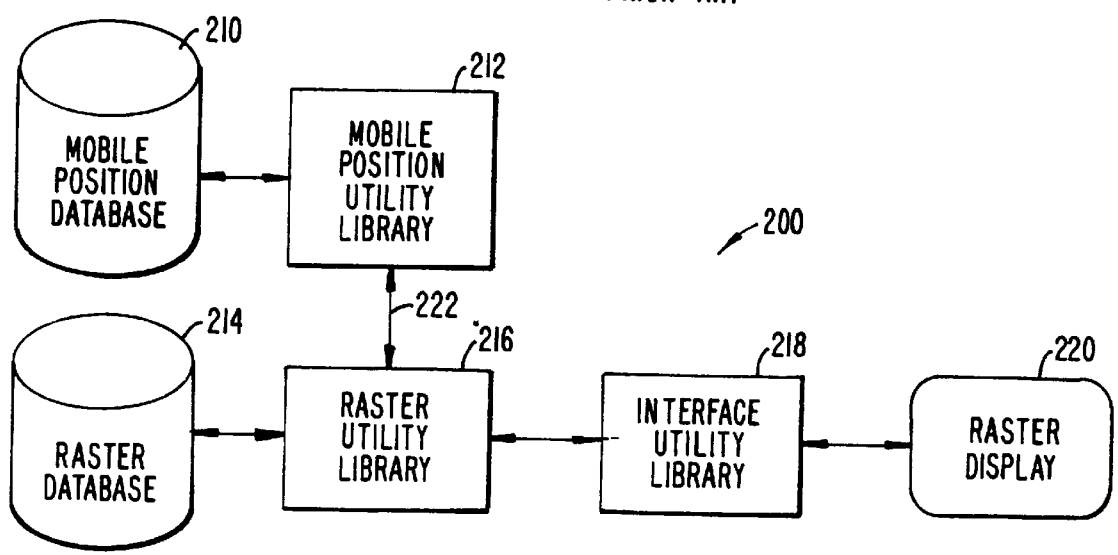
FIG. 2 illustrates a block diagram of the raster map display system for implementing the raster display shown in FIG. 1.
Figure 3:
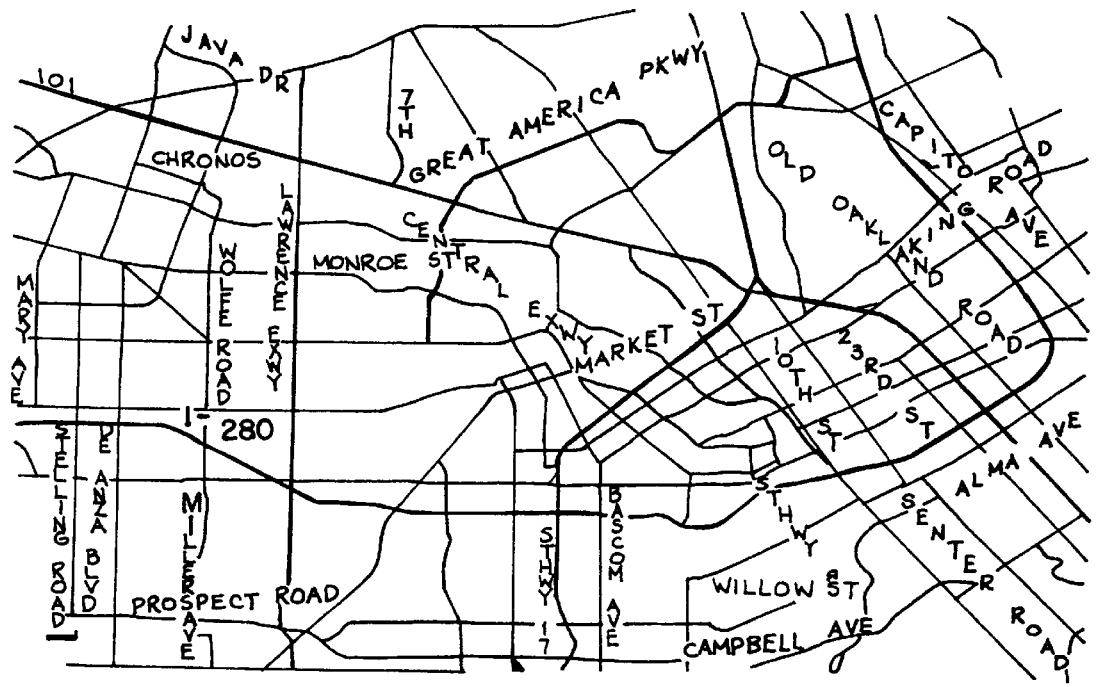
FIG. 3 illustrates a vector map display.
Figure 4:
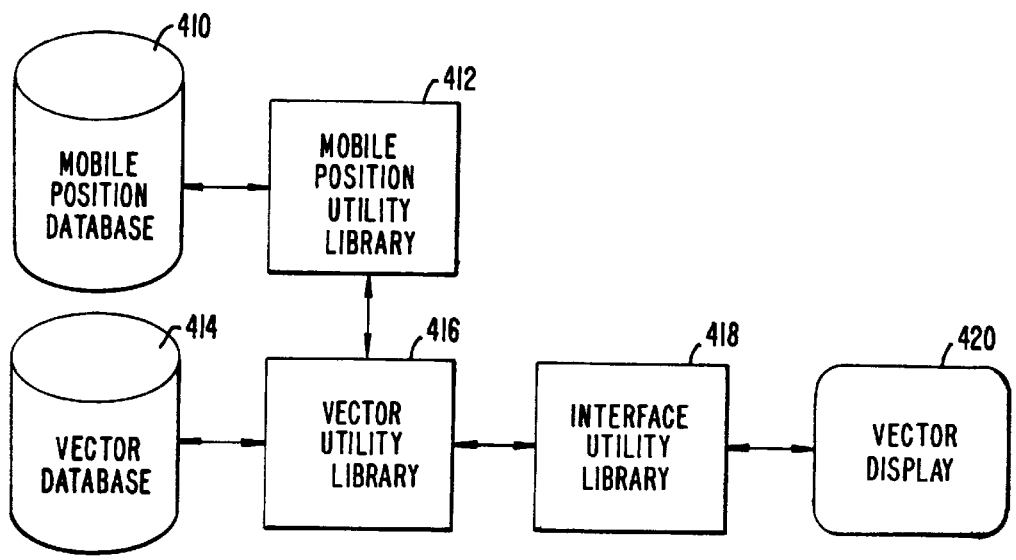
FIG. 4 illustrates a block diagram of the vector map display system for implementing the vector display shown in FIG. 3.
Figure 5:
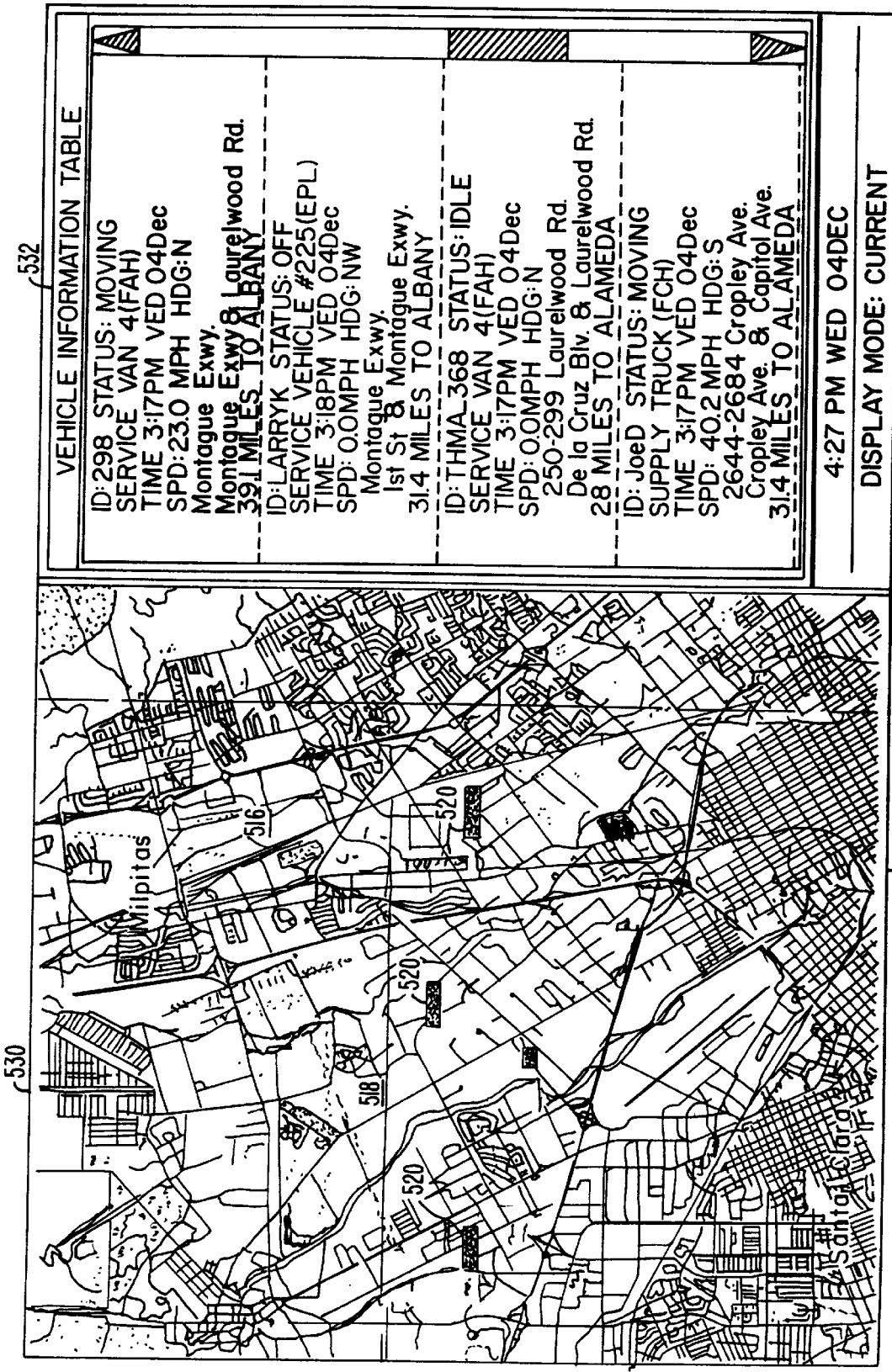
FIG. 5 illustrates a simplified integrated raster map display and vector information display according to the present invention.

FIG. 5 illustrates an integrated raster map display and vector information display according to an embodiment of the present invention. The raster map 510 includes natural features such as marshlands 512, creeks 514, and the like. The raster map 510 also includes man-made features such as the Auto Assembly Plant 516, Agnews Hospital 518, and others. The raster map is, for example, a digitally scanned road map, a digitally scanned automobile road map, a raster image in digital form, a pre-existing digital map without intelligent information, a digital map in TIFF format, a digitized video image, a digitized satellite image, or the like. Of course, the raster map can also generally be almost any type of digital map with substantially clear features without intelligent street information or the like.

Icons 520 show the position of the vehicles identified in the vector information table 528. But it will be recognized that the icons can also represent any mobile entities such as automobiles, vans, trucks, ambulances, animals, people, boats, ships, motorcycles, bicycles, tractors, moving equipment, trains, courier services, container ships, shipping containers, airplanes, public utility vehicles, telephone company vehicles, taxi cabs, buses, milk delivery vehicles, beverage delivery vehicles, fire trucks and vehicles, hazardous waste transportation vehicles, chemical transportation vehicles, long haul trucks, local haul trucks, emergency vehicles, and the like. The icons can represent any mobile or potentially mobile entity or the like.

The vector information table 528 indicates selected geographic and cartographic information retrieved from, for example, the vector database. The vector information table 528 provides intelligent street information such as block number, address information, nearest cross-section of major streets, and the like with reference to the vehicle position. The vector table can also provide information about vehicle speed, vehicle heading, an activity status, a time status, and the like.

The display shown in FIG. 5 can be divided into at least two regions or segments such as a raster display segment 530, a vector information display segment 532, and others. The raster display segment 530 includes a first and second axis 534, 536 representing the latitudinal and longitudinal position of the vehicle position, respectively. Alternatively, the raster display segment may be in cylindrical or polar coordinates, and may not be limited to two dimensions.

A digitized map of the region through which the vehicle travels is displayed in the first segment of the display 530, adjacent to the first and second axis 534, 536. As noted above, each vehicle is represented as an icon. The icons may be color coded relative to a status chart and the like. Of course, the shape and color of each icon depend upon the particular application.

Figure 6:
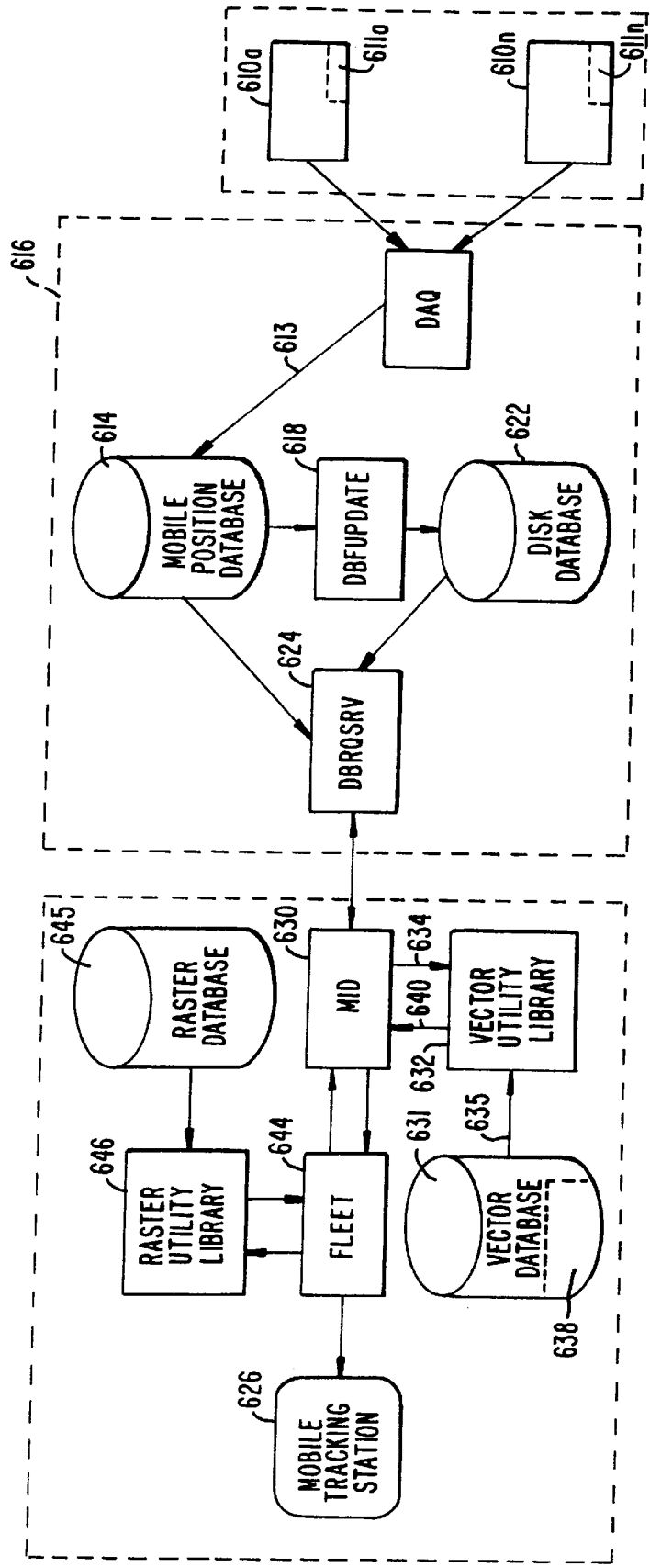
FIG. 6 illustrates a simplified block diagram of the integrated raster map display and information display shown in FIG. 5 according to an embodiment of the present invention.
Figure 7:
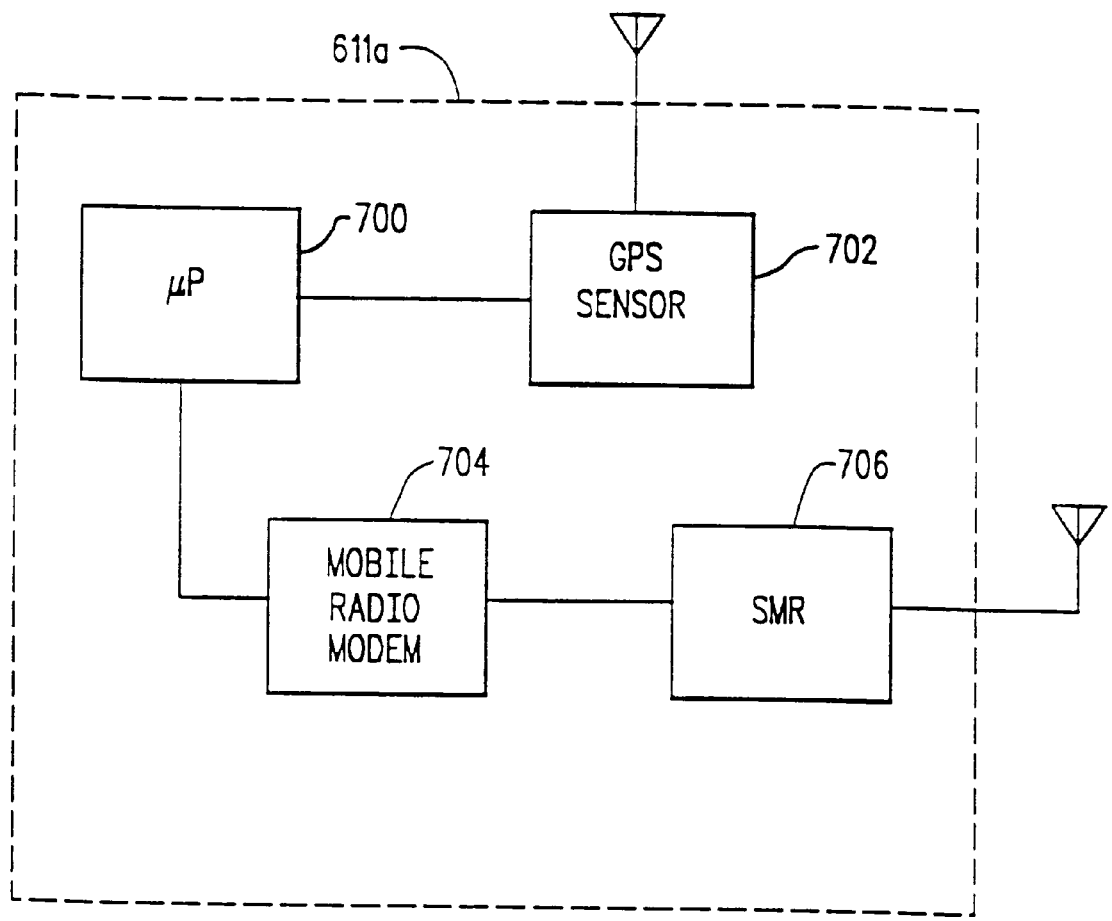
FIG. 7 illustrates a simplified block diagram of a mobile radio of FIG. 6 according to an embodiment of the present invention.

FIG. 6 illustrates a block diagram of the fleet tracking system 600 for automatic vehicle location according to the present invention. Each vehicle 610a–610n includes a navigational tracking device hereafter called a fleet mobile data suite (MDS) 611a–611n. The fleet MDS 611 includes a microprocessor-controlled circuit coupled to a GPS navigational sensor, a mobile radio modem, and a specialized mobile radio (SMR) operational in the 800–900 MHz frequency range. The fleet MDS 611 continuously compiles latitude and longitude position data from the GPS sensor. Latitude and longitude position data is periodically transmitted to the data acquisition system 612.

The mobile position block 616 processes vehicle location information typically on a UNIX based computer. The mobile position block 616 includes a data acquisition system 612, a mobile position database 614, a UNIX process DBFUPDATE 618, a disk database 622, and a UNIX process DBRQSRV 624. The data acquisition system 612 includes a personal computer coupled to both a base data link controller, and a specialized mobile radio (SMR) operational in the 800–900 Mhz frequency range. The data acquisition system 612 receives latitude and longitude position data from the fleet MDS 611, attaches a vehicle identifier to the navigational position data, and transmits the data block 613 (vehicle identification, latitude, longitude) to the mobile position database 614. Vehicle position is defined in terms of a latitude and longitude value during a predetermined time period.

The UNIX process DBFUPDATE 618 scans the mobile position database 614, preferably every 5 seconds, for any new information from the fleet MDS. The new data 620 is permanently stored in the disk database 622 for subsequent retrieval of historical information. Another UNIX process DBRQSRV 624 processes requests by the user from the mobile tracking station 626 for navigational position information. The mobile tracking station 626 can be a high resolution color UNIX workstation. User requests 628 are originated by mobile information data process 630, a UNIX process running on the mobile tracking station 626.

The mobile information data process 630 receives latitude and longitude position data for a particular vehicle. The mobile information data process 630 accesses the vector database 631 using the vector utilities 632. The vector utilities 632 match the latitude and longitude position information 634 to the latitude and longitude of street segment information 636 from the vector database 631. In addition, the vector utilities 632 match the latitude and longitude position information 634 to the latitude and longitude information of the cross-section of major streets 636 in the cross-section vector database 638. The cross-section vector database 638 can be a subsection of the vector database 631.

The nearest matching street segment, its street name and block number range, and the nearest cross-section of major streets, and its street name 640 are transmitted to the mobile information data process 630. The mobile information data process 630 attaches the street text information to the mobile position information and sends this data packet 642 to the fleet process 644.

The fleet process 644, a UNIX based process or the like, is the user interface display process. The fleet process 644 receives mobile position information and street text information from the mobile information data process 630. In addition, the fleet process 644 accesses the raster database 645 through the raster map utilities 646.

The raster map utilities 646 match the latitude and longitude mobile position 648 from the fleet MDS 611 to the various digitized raster maps data 650 in the raster map database 645. By specifying the zoom level option, using as an example, the X11/Motif graphical user interface on the mobile tracking station 626, the digitized raster map is displayed in one display window segment 530 and the corresponding street text information on another display window segment 532 shown in FIG. 5. A user locatable mark 520 represents the fleet MDS position for a particular vehicle. The icon 520 is positioned at the corresponding latitude and longitude location on the raster map display 530.

Historical data requests may be made by specifying a particular time period and a particular fleet MDS 611. The data request is sent by the fleet process 644 to the mobile information data process 630. The mobile information data (MID) process 630 in turn sends a request 628 to the DBRQSRV 624 process. The DBRQSRV 624 process accesses the disk database 622 and retrieves reports for the specific time period and fleet MDS 611. For every historical report sent back to the MID process 630, the above described process flow for accessing and displaying the raster map, vector street information, and displaying the user locatable mark representing the position of the navigational system is followed.

The vehicle display system includes at least three databases (a mobile position database 614, a raster database 645 and a vector database 631). The database information is interrelated by common latitude and longitude position data. A mobile tracking station 626 displays the position, raster and vector information in a format easily understood by the dispatcher or fleet manager.

The first database, the mobile position database 614, is a positional information database for storing vehicle position information received from the navigation systems. Navigational data transmitted from systems such as LORAN and GPS (Global Positioning System) is stored into data records indicating the latitude and longitude of a particular vehicle during a predetermined time interval. The DAQ process 612 is used to format position data received from the navigational system into the mobile position database 614. The vehicle identification is used as a locator field to access the database for a particular vehicle. Vehicle position data is stored relatedly to the vehicle identifier.

The second database, the raster database 645, is generated by digitally scanning a standard road map or paper map. The raster database 645 contains a digitized version of the visual features of the land for a specified region. Digitized raster information is stored in the raster database 645 in data records. Each data record corresponds to a digitized region having a particular latitude and longitude value. The latitude and longitude values are used as a locator field for accessing the raster database 645.

Data from both the raster database 645 and the mobile position database 614 are used in displaying the raster map and icon 520 in the first segment 530 of the display shown in FIG. 5. The fleet process 644 in combination with the raster map utilities 646, MID process 630, and vector map utilities 632 contain routines to access the mobile position database 614 and the raster map database 645. Both the mobile position database 614 and the raster map database 645 include a latitude and longitude field identifier. The raster map utility 646 in combination with the fleet process 644 and MID 630 matches the longitude and latitude values from the mobile position database 614 and the raster map database 645 and displays an icon 520 (representative of a particular vehicle) moving along the raster map as it changes its latitude and longitude position. The icon 520 moves according to the navigational data extracted from the mobile position database 614 for a particular vehicle. The icon 520 is also displayed in the first display segment 530. Since the latitude and longitudinal position of the icon 520 corresponds to a street location, the icon 520 moves along a particular street on the raster map display 530.

However, because the raster map is merely a digitized representation of the street, no interrelationship between different street locations or landmarks exists and intelligent street information is not displayed. A third database, the vector database 631, is needed to provide intelligent street information.

Vector address data and street information is publicly available from the US Census Bureau. The US Census provides GBF/DIME (Geographic Base Files/Dual Independent Map Encoding) files which are a common source of address data for dispatching applications. These files contain information describing the street network and other features. Each field record contains the segment name, address range and ZIP code. Node numbers for intersections are referenced to the vehicle latitude and longitude coordinate position.

A third database, the vector database 631, contains vector information provided from GBF/DIME files. Vector information is displayed in the second display segment 532. The vector information displayed in segment 532 is typically displayed as text and relates intelligent street information corresponding to the latitude and longitude of a particular vehicle. Display segment 532 of FIG. 5 represents the vector text information.

The MID process 630 contains routines to access the mobile position database 614. Both the mobile position database 614 and the vector map database 631 include a latitude and longitude field identifier. The vector utility 632 in combination with the MID process 630 contains routines to extract block number, street name, cross-section of major streets and other address related information and to match the longitude and latitude values from the mobile position database 614 to the vector map database 631. The mobile tracking station 626 displays the vehicle position on a raster map and corresponding address information simultaneously.

The steps for display of the integrated system include defining a coordinate system having a first axis representing the latitude of the vehicle position and a second axis representing the longitude of the vehicle position. Digitized information representative of a raster map is extracted from the raster database 645 and displayed adjacent to the first and second axes to form a raster map of a first predefined area.

Mobile position data from the GPS navigation system corresponding to vehicle latitude and longitude position during a predetermined time interval is extracted from the mobile position database 614. A user locatable mark 520 in the first display segment 530 corresponding to the latitude and longitude of the vehicle position is displayed. Intelligent street information is extracted from a third database, the vector database 631. Vector text information is displayed in a second segment 532 of the display. The vector text information corresponds to the latitude and longitude of the user locatable mark 520.

Figure 8:
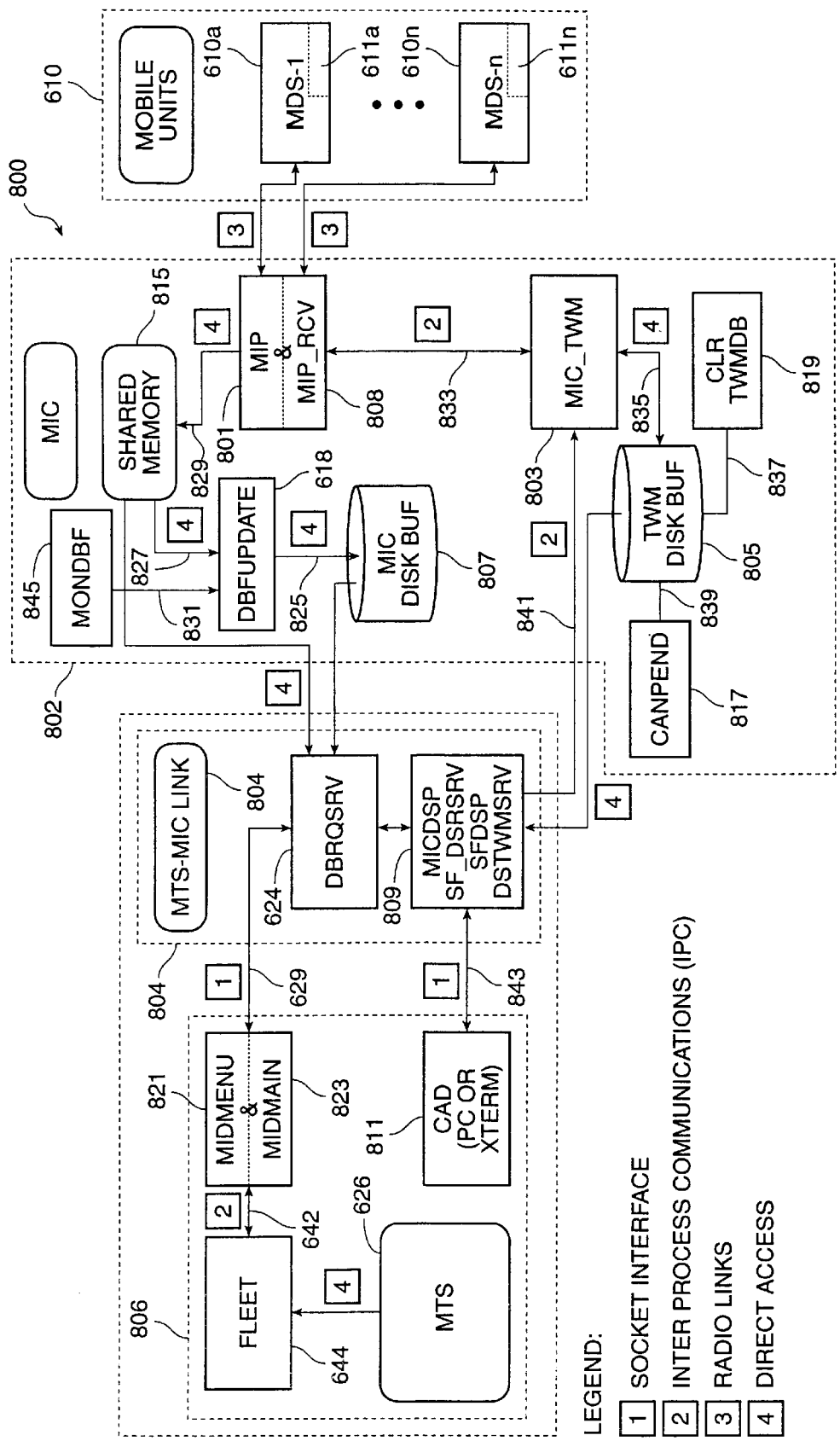
FIG. 8 illustrates a simplified block diagram of the integrated raster map display and information display shown in FIG. 5 according to an alternative embodiment of the present invention.

FIG. 8 illustrates a simplified block diagram 800 of an integrated raster map display and information display according to an alternative embodiment of the present invention. The block diagram is merely a simplified illustration and should not limit the scope of the claims as defined herein. The block diagram provides functions for accessing mobile information center (MIC) databases and servers to handle sub-systems such as an automatic vehicle location (AVL) system, a two-way messaging (TWM) system, a computer aided dispatch (CAD) system, and others. The simplified block diagram includes fleet mobile units 610, a mobile information center (MIC) 802, a mobile tracking system-mobile information center link (MTS-MIC LINK) 804, a mobile tracking system 806, among other features.

The mobile tracking system 806 includes system elements such as a mobile tracking station 626, a fleet process 644, a computer aided dispatch system 811, a mobile information data menu (MIDMENU) 821, a mobile information data main process (MIDMAIN) 823, and other elements. The mobile tracking system provides functions similar to the previous embodiment, but also has the computer aided dispatch system 811 and other elements. Selected system elements from the previous embodiment such as the mobile information data process 630, raster utility library 646, raster database 645, vector database 631, vector utility library 632 are combined within the MIDMENU & MIDMAIN 821, 823 process (hereinafter collectively "MIDMAIN"). A UNIX process such as the DBRQSRV 624 processes requests by a user from the mobile tracking station 626 for navigational position information. The mobile tracking station 626 can be any suitable high resolution color UNIX workstation or the like. User requests originate at the MIDMAIN 821, 823 process which is a UNIX process running on the mobile tracking station 626.

The MIDMAIN 821, 823 process receives latitude and longitude position data for a selected mobile unit MDS-1 to MDS-n via line represented as 629. The MIDMAIN 821, 823 process accesses the vector database (or memory) 631 using the vector utilities. The vector utilities match the latitude and longitude position information to the latitude and longitude of street segment information from the vector database. The vector utilities also match the latitude and longitude position information to the latitude and longitude information of the cross-section of major streets in the cross-section vector database. The cross-section vector database is a subsection of the vector database, all within the MIDMAIN 821, 823 process or the like.

The MIDMAIN 821, 823 process via vector utility library retrieves the nearest matching street segment, its street name and block number range, and the nearest cross-section of major streets, and its street name and other information. The MIDMAIN 821, 823 process via mobile information data process attaches the street text information to the mobile position information and defines such information as a data packet or the like. The MIDMAIN 821, 823 process sends the data packet over a line represented as 642 to the fleet process 644.

The fleet process 644 is a user interface display process. The fleet process can be any suitable user interface display process such as a UNIX process or the like. The fleet process 644 receives mobile position information and street text information from the MIDMAIN 821, 823 process. The fleet process 644 accesses via line represented as 642 the raster database (or memory) through the raster map utilities, all in the MIDMAIN 821, 823.

The raster map utilities match the latitude and longitude mobile position from the fleet mobile units to the various digitized raster maps data in the raster map database. By specifying the zoom level option, using for example the X11/Motif graphical user interface on the mobile tracking station 626, the digitized raster map is displayed in one display window segment 530 and the corresponding street text information on another display window segment 532. A user locatable mark 520 (or icon) represents the fleet mobile units position for a particular vehicle. The icon 520 is positioned at the corresponding latitude and longitude location on the raster map display 530.

The display system includes at least three databases or memory locations and the like (a mobile position database 614, a raster database 645, and a vector database 631). The database information is interrelated by common latitude and longitude position data. The mobile tracking station 626 displays the position, raster and vector information in a format easily understood by the dispatcher or fleet manager. For example, the raster information includes a graphical representation of the raster map and icons graphically depicting locations of the fleet mobile units on such raster map. Vector information is superimposed onto the raster map to provide intelligence. Other functions of the vehicle display system are similar to the previous embodiment.

In the fleet mobile units, each vehicle 610*a*–610*n* includes a navigational tracking device, hereinafter called a fleet mobile data suite (MDS-1 to MDS-n) 611*a*–611*n*. Each fleet MDS 611*a*–611*n* includes elements such as a microprocessor-controlled circuit coupled to a GPS navigational sensor and the like, a mobile radio modem, and a specialized mobile radio (SMR) operational in, for example, the 800–900 MHz frequency range. But it would be recognized that the specialized mobile radio may be any type of wireless communication means such as cellular telephone, frequency modulated (FM) carrier means, cellular digital packet data means (CDPD), satellite communication, wide area wireless communication network (WAN) such as a product called Ricochet™ sold by Metricom of Las Gatos, Calif., and others. The mobile radio modem can also be a data modem, PCMCIA card modem, or the like for transporting data signals, voice signals, video signals, and the like. The fleet MDS 611*a*–611*n* compiles latitude and longitude position data from GPS sensors in a continuous manner and the like. Latitude and longitude position data are periodically transmitted at for example 5 minute increments or less to the mobile information center 802 block.

The automatic vehicle location system provides for vehicle tracking by way of selected elements from the fleet mobile units, the mobile information center, and other elements. The automatic vehicle system includes elements such as a UNIX DBFUPDATE server 618, a UNIX DBRQSRV server 624, a data acquisition and messaging interchange module (MIP or messaging interchange module) 801, a data acquisition and messaging interchange module and receive module (MIP_RCV) 808, a monitoring process (MONDBF) 813, and others. Also shown are a shared memory 815, a mobile information center (MIC) disk buffer 807, and other elements. Of course other types of servers and elements may be used depending upon the particular application.

In the automatic vehicle location system the UNIX DBFUPDATE server 618 monitors the shared memory 815 via line represented as 827 for any new reports or updated reports. The UNIX DBFUPDATE server 618 transfers the reports from the shared memory 815 to the mobile information center disk buffer 807 in a periodic manner via line represented as 825. The reports include information such as a time, a vehicle location, a driver name, a vehicle number, a vehicle speed, a vehicle status, and others. The UNIX DBFUPDATE server 618 uses memory and file locking protocols to access data from the shared memory 815. The UNIX DBFUPDATE server 618 process runs continuously, transferring reports in data form from the shared memory 815 to the mobile information center disk buffer 807.

The shared memory 815 can be a dynamic random access memory which can store up to about 50 or less reports per vehicle. Accordingly, it is important that the data in shared memory 815 be transferred to the mobile information center disk buffer 807 before the shared memory fills up with data. For example, vehicles reporting every minute fill up the shared memory 815 in about 50 minutes or less, and the new data coming into the shared memory can be overwritten. Of course, as dynamic random access memory capacity increases, more reports can be stored in the shared memory 815.

The UNIX DBRQSRV 624 server processes requests from login to logoff from the automatic vehicle location subsystem, and in particular a workstation. The workstation can be any suitable workstation of sufficient memory and processing means to handle data as described herein. The UNIX DBRQSRV 624 server also forks out a copy of its process upon connection on a socket. The fork out process verifies login information and processes requests from each workstation. The UNIX DBRQSRV 624 server also provides for a different (or second) communication channel with the use of a computer aided dispatch (CAD-type) messages as will be described in more detail below. Other functions of the UNIX DBRQSRV were described in the previous embodiment.

An interface between fleet mobile units 610 and mobile information center disk buffer 807 is provided by the messaging interchange process (MIP) 801. In particular, vehicle position reports from the mobile units 610 are transferred to the shared memory 815 via line represented as 829. The UNIX DBFUPDATE server transfers the vehicle position reports into the mobile information center disk buffer 807 via line represented as 827. As previously noted, the vehicle position reports include at least latitude and longitude information at a selected time and the like.

The MIP_RCV process 808 assistants (or is an assistant to) the messaging interchange process 801. In particular, the MIP_RCV process 808 receives data from the messaging interchange process 801 and processes the data to determine a forwarding path. For example, some data are sent back to the messaging interchange module 801 for forwarding to the fleet mobile unit(s) 610, and other data go into the shared memory 815 and/or the two way messaging disk buffer 805, among other elements. Of course, the MIP_RCV may also forward data to other elements of the mobile information center, mobile tracking station, and the like.

The automatic vehicle location system also includes the monitoring process such as the MONDBF 845 and the like. The MONDBF 845 is often dormant but periodically wakes up and checks the DBFUPDATE process 618 via line represented as 831. If the DBFUPDATE process 618 is not running, the MONDBF 845 outputs a warning message to an output device such as a screen or a printer, typically in standard UNIX shell script language or the like. The warning message alerts a user and appropriate action such as maintenance of the system or the like occurs. Of course, other forms of monitoring processes and/or systems may also be used depending upon the particular application.

The two-way messaging system provides for two-way messaging between the fleet mobile units 610 and, for example, a dispatcher or the like. The two-way messaging system is a "dumb" messaging system for communicating voice, data, video, and the like information between the fleet mobile units and the dispatcher and the like. The two-way messaging system includes elements such as a mobile information center two-way messaging module (MIC_TWM) 803, a UNIX DSTWMSRV server 809, a CANPEND process 817, a CLRTWMDB process 819, and others.

A message such as a two-way message and the like from one of the fleet mobile units goes to the MIC_TWN process from the message interchange module 801 via line represented as 833. A message from a dispatcher goes to the fleet mobile units through the MIC_TWM module (or process) 803 through the messaging interchange module 801 via lines represented as 841 and 833. The MIC_TWM module provides an interface between the dispatcher and the fleet mobile units 610 for two-way messaging. The MIC_TWM module also has write access to a two-way messaging (TWM) database 805 and other memory devices via line represented as 835. The MIC_TWM module has read access to the two-way messaging database 805 and other memory devices via line represented as 835. The MIC_TWM module also records in-coming (fleet mobile units to mobile information center) and outgoing (mobile information center to fleet mobile units) messages in the two-way messaging disk buffer or the like. The MIC_TWM module creates queues for communication between the messaging interchange 801 module, the DSTWMSRV 809, and any other two-way messaging module, and is often started first in the two-way messaging system.

The CANPEND module 817 cancels pending messages via line represented as 839. Pending messages may be defined as messages sent to vehicles that are turned "off" or messages that need "acknowledgment" which are queued up as "pending" until they are delivered or acknowledged. The CANPEND module 817 reduces the likelihood of messages being piled up or the like. The CANPEND module 817 is preferably activated periodically to automatically cancel pending messages and the like. The cancelled messages are stored in the TWM disk buffer 805, and can be viewed via a HISTORY_DATA option, but the status is preferably displayed as "cancelled" in a selected display device.

The CLRTWMDB module (or process) 819 clears the two-way messaging disk buffer of incomplete message transactions in the event that the messaging interchange process 801 or the MIP_RCV 808 process is restarted. The CLRTWMDB module 819 clears status prompts such as message sent or message fail and other types of status prompts from the two-way messaging disk buffer, and leaves the messages as pending. The CLRTWMDB process 819 is often executed before the messaging interchange module process, but can also be executed at other times.

The computer aided (CAD) dispatch process provides dispatching for the fleet mobile units from the dispatch office. The computer aided dispatch process includes servers (or modules) 809 such as a MICDSP server, a UNIX SF_DSRSRV server, a SFDSP server, and others. The computer aided dispatch also includes a system 811 (or module). The system or module can be any suitable computer aided dispatch software and hardware combination or the like.

The MICDSP server defines an interface to the CAD process 811 and other system elements such as the mobile tracking station 626, the fleet mobile units 610, and the like. The MICDSP server translates data coming from the CAD system 811 via line represented as 843 and formats the data into the mobile information center system specifications or the like. The MICDSP server passes data to the SF_DSRSRV process, a UNIX socket level interface process or the like.

The SF_DSRSRV server provides an interface between the MICDSP server and the SFDSP server. The SF_DSRSRV server deciphers different types of CAD messages and routes them to either the SFDSP or DBRQSRV servers. Messages from the fleet mobile units are sent to SFDSP server, while display and driver status type of messages are sent to the MTS station via the DBRQSRV process.

The SFDSP module provides a connection to the two-way messaging disk buffer for a store-n-forward mechanism. The SFDSP provides socket connection to the DSTWMSRV process and sends CAD messages via the two-way messaging disk buffer to the fleet mobile units. Statuses are returned to the CAD system by the fleet mobile data units via the SFDSP process. The SFDSP process also reads the SUPERUSR account information of the fleet mobile units at start-up time via a login packet transaction.

Figure 9:
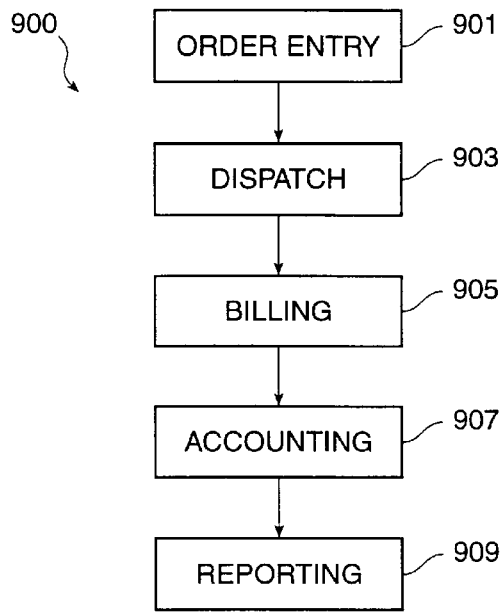
FIG. 9 is a simplified flow diagram of a computer aided dispatch system according to the present invention.

The computer aided dispatch (CAD) system can be any suitable computer aided dispatch method and apparatus according to the present invention. The computer aided dispatch system can be programmed via software in a suitable language into a system including a computer and sufficient memory to handle data from orders. An example of a computer aided dispatch system was sold by an ADAQ Systems Corporation. A simplified flow diagram of a computer aided dispatch method is illustrated by FIG. 9. The computer aided dispatch system 900 includes at least steps of order entry 901, dispatch 903, billing 905, accounting 907, reporting 909, and others. But it would be recognized by one of ordinary skill in the art that other steps can also be incorporated into a computer aided dispatch system depending upon the particular application.

The step of order entry 901 captures order information for processing an order at the time of an order. The order often comes in by way of a phone call, an e-mail, a phone mail, postal mail, or the like to the computer aided dispatch system. The order information includes elements such as a caller (or company), a phone number (or e-mail number), billing data, origin data, destination data, and other data. The billing data often include a billing name, an address, an authorization number, and the like. Origin data include information with regard to pick-up (or origin) such as a contact name, pickup address, and the like. The destination data include a contact name, destination address, and the like. Of course, other forms of data may also be captured depending upon the particular application.

Optionally, the order entry step occurs automatically or semi-automatically or the like. For example, the order entry step may include a caller identification features such that the caller's name and number automatically download into the computer aided dispatch system memory. The caller can also use a touch tone feature of a conventional phone to input a pick-up location and delivery location. The caller may select a particular location by depressing a unique input number, alphanumeric character, or combination thereof, or the like corresponding to the location. The computer aided dispatch system automatically inputs such caller identification, pick-up location, and delivery location features into memory.

Figure 10:
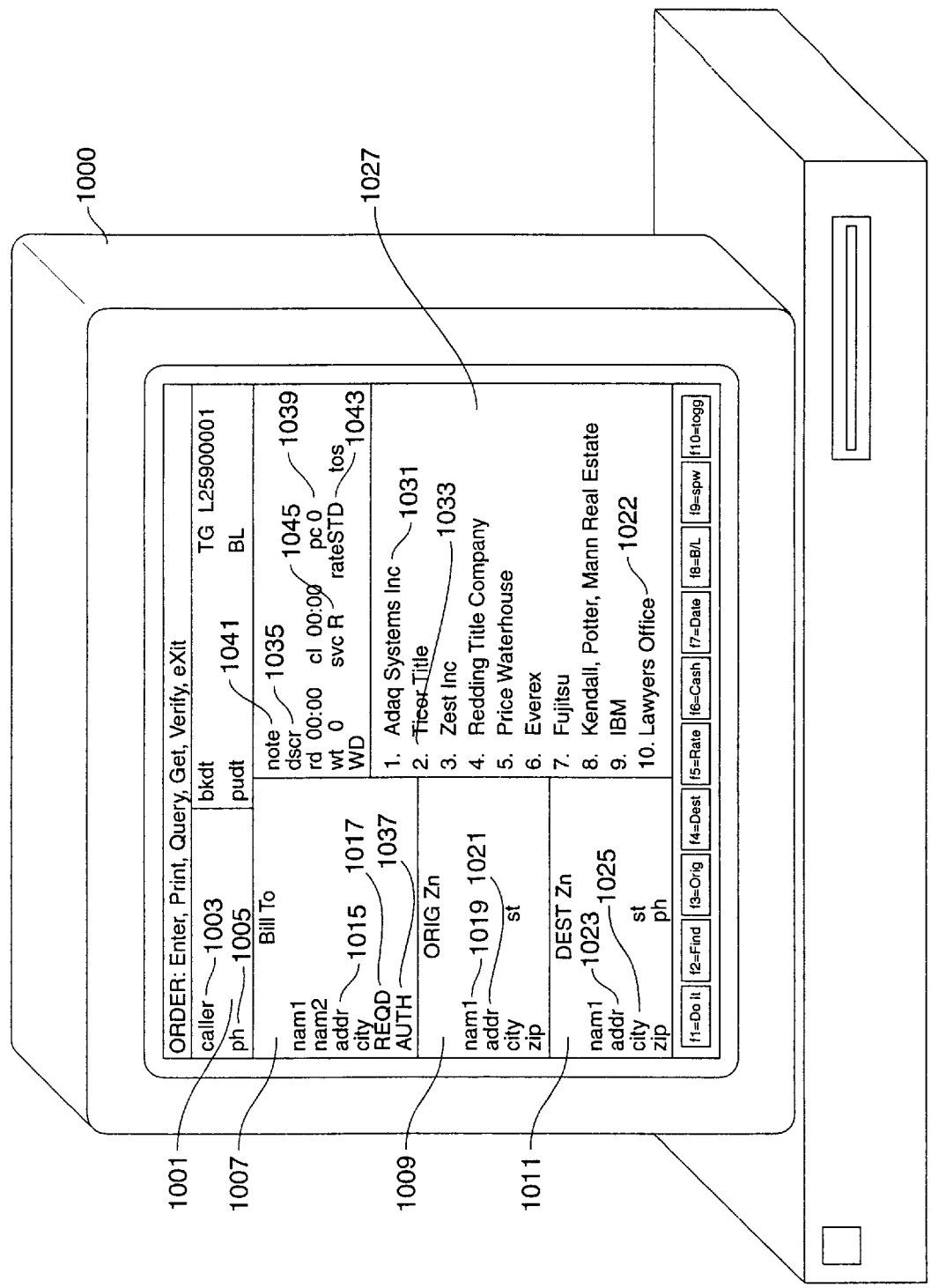
FIG. 10 is a simplified order entry screen of the system of FIG. 9 according to the present invention.

A simplified example of an order entry screen 1000 for order entry 901 is illustrated by FIG. 10. The order entry screen can be on any suitable computer or dumb terminal at, for example, a dispatch station or the like or a customer location. The order entry screen in the example provides a snap-shot of a customer account. The order entry screen divides into a plurality of regions (or multiple screens), each having data for a selected input. A user may access each section by way of an input device such as function keys f1, f2, f3 . . . fn, and others, hot keys or the like, a mouse in, for example a Windows™ environment, or the like. The order entry screen includes a screen portion for caller information 1001 such as a caller field 1003 and a phone number field 1005. The order entry screen also includes screen portions for billing data 1007, origin data 1009, destination data 1011. The billing data 1007 include fields for a billing name 1013, an address 1015, and an authorization number 1037. The origin data 1009 include fields for a contact name 1019 and an address 1021. The destination data include fields for a contact name and address 1023 and a destination 1025.

Optionally, the order screen can also include a screen portion 1027 identifying common delivery points for each account. The delivery points are listed by, for example, company 1031 and corresponding number 1033. Information such as an address, a contact person, route information and the like, is stored in memory for each company. In a preferred embodiment, a customer accesses the computer aided dispatch system via phone and inputs the delivery and origin data by way of the corresponding number. Alternatively, the user specifies the delivery points for the customer via input device at the dispatch station. As the customer adds additional delivery points, the information is automatically added to the customer account information and stored into memory for later use. Of course, other information can also be displayed on the screen, as well as other techniques for accessing and entering the delivery points.

On the order entry screen, the customer account can also include data such as payment delinquency information 1035, authorization information 1037, customer rate information 1039, customer notes 1041, and other information. The payment delinquency information can be shown on the screen by an indicator such as a flashing "HOLD" indicator or the like. A payment delinquency also places a hold on the account to prevent the user from taking the order from the customer. The user may, for example, release the hold on the account and take the order for the customer and inform the customer of such payment delinquency. Alternatively, a user can refuse to take the order from the customer until payment. If the customer account is seriously delinquent, that is, past a selected number of days such as more than 60 days, more than 90 days, more than 120 days or the like, a second level hold can be placed onto the account. A second level authorization with a selected password can bypass the second hold level to allow the user to the take the order from the customer. Alternatively, the user can refuse to take the order from the customer until payment. Of course, the present system can be tailored to include a selected amount of authorization steps and indications depending upon the application.

Certain customers require the use of authorization information to be provided to the user before the user takes the order from the customer. The authorization information may include, for example, a reference number, a department name, an invoice number, or other information.

As previously noted, the order screen also includes customer rate information 1039 and customer notes 1041, among other information. The customer rate information 1039 includes fields for rates 1043 and corresponding services 1045. The customer notes include any additional information as specified by the customer which are not defined in the other fields as previously described. Other information can include a ready time (if different from the call-in time), a required delivery time, pieces and weight, service type, vehicle type, other reference numbers such as an air bill or the like, an on-screen price quote, and the like.

The dispatch step 903 transfers dispatch information from a dispatch screen, a dispatch ticket, or a combination of both to the dispatch location. The dispatch step transfers the dispatch information via a phone line, a wide area network, a local area network, a pager, or any other communication means available for the particular application. The dispatch information is sent to the dispatch directly, or at selected time prior to the ready time for pre-scheduled or daily jobs. The dispatch location can include multiple dispatch stations, a single dispatch station, or the fleet mobile unit itself. For example, the dispatch step transfers orders with a downtown address to the downtown dispatcher. Alternatively, the dispatch step transfers orders that require trucks to the truck dispatcher. Alternatively, the dispatch step sends the order to the driver directly via pager, radio unit, cellular telephone, or any other available communication means.

In an embodiment using the dispatch screen, the computer aided dispatch system updates the order record with time information such as a dispatch time, a pick-up time, and a delivery time as such times (or in real time). Accordingly, any user with access to the computer aided dispatch system can query a selected order and see the status of the order at a selected time without disturbing any other user.

Figure 11:
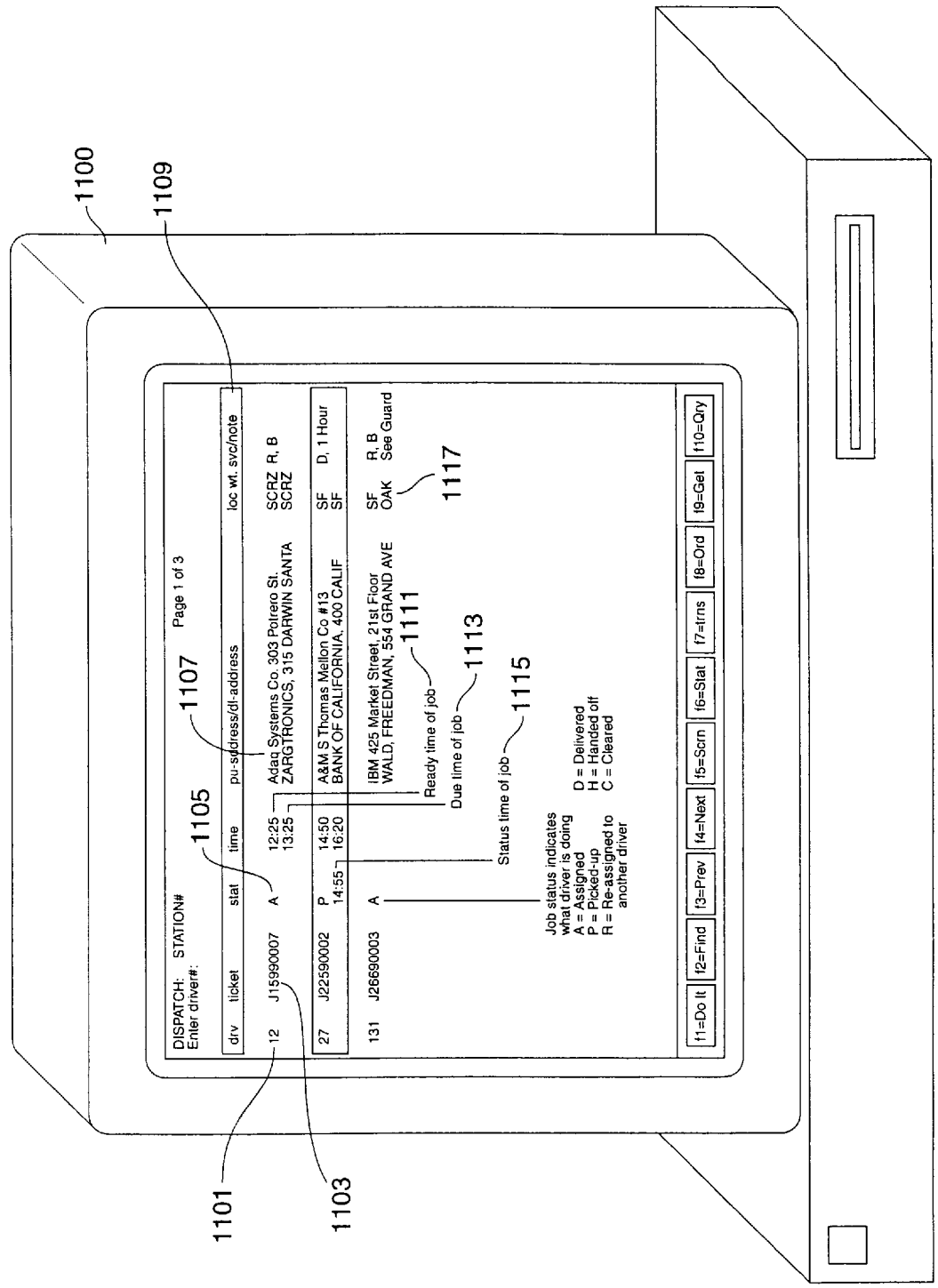
FIG. 11 is a simplified dispatch screen of the system of FIG. 9 according to the present invention.

FIG. 11 is a simplified example of a dispatch screen 1100 according to the present invention. The dispatch screen is merely an example and should not limited the invention as described by the claims herein. The dispatch screen 1100 includes driver numbers 1101, ticket numbers 1103, status letters 1105, pickup/delivery addresses 1107, notes/service 1109, ready times 1111, due times 1113, a status time 1115, location 1117, and other information. The status letter provides a selected letter corresponding to the driver as shown in Table 1.

| STATUS LETTER | DESCRIPTION |
|---|---|
| A | Order Assigned to Driver |
| P | Order Picked-up by Driver |
| R | Order Re-assigned to Another Driver |
| D | Order Delivered by Driver |
| H | Order Handed Off to Driver |
| C | Order Cleared by Driver |

As shown, Table 1 provides an example of status letters and corresponding descriptions. Of course, other types of letters or characters can also be used to designate selected statuses in other applications.

Optionally, the dispatch screen is in color for easy identification of selected orders and the like. For example a green highlight of an order indicates an order that requires a delivery time of one hour or less. A red highlight indicates an order with a delivery time of a half an hour or less. Once a selected cut-off time passes, the orders can remain in red, but flash continuously to indicate a missed order or the like. Of course, other color selections and indications can be used depending upon the particular application.

The computer aided dispatch system provides a billing 905 step according to the present invention. The billing step preferably occurs on the same day as the day the order is completed, or more preferably within hours of order completion. Alternatively, the billing occurs on a time schedule such as a weekly basis, a bi-weekly basis, a monthly basis, a quarterly basis, or any other time basis. The computer aided dispatch system automatically (or semiautomatically) outputs the billing information for the selected account at the selected time. The output occurs as, for example, a printout, a download from a direct on-line link to the customer premises, and the like.

The computer aided dispatch system also includes an accounting 907 step with corresponding accounting module or the like. The accounting step provides for cash posting methods, invoicing methods, and other methods of posting payment on a selected order. The accounting module provides credits and account balances to be retrieved by way of a key or any other input means. A credit caused by the driver of the fleet mobile unit may be charged back to the driver and then stored in a selected memory. The module may also calculate driver commissions with a key based upon rate data, delivery information, and the like. A hold status can be placed on a particular account when an account is overdue. Details with regard to a hold status were described in an aforementioned embodiment. The module also provides data from an accounts payable, a payroll, and a general ledger, among others.

A reporting 909 step is also included in the present method. The reporting step provides for reports from memory by way of a selected key. The reporting step includes reports such as sales reports, aging reports, service analysis reports, commission reports, customer activity reports, common caller reports, period processing reports, gross profit reports, revenue distribution reports, payment/adjustment reports, order entry count reports, zone distribution reports, summary exception reports, rate sheet printing reports, sales person reports, driver productivity reports, and others.

Figure 12:
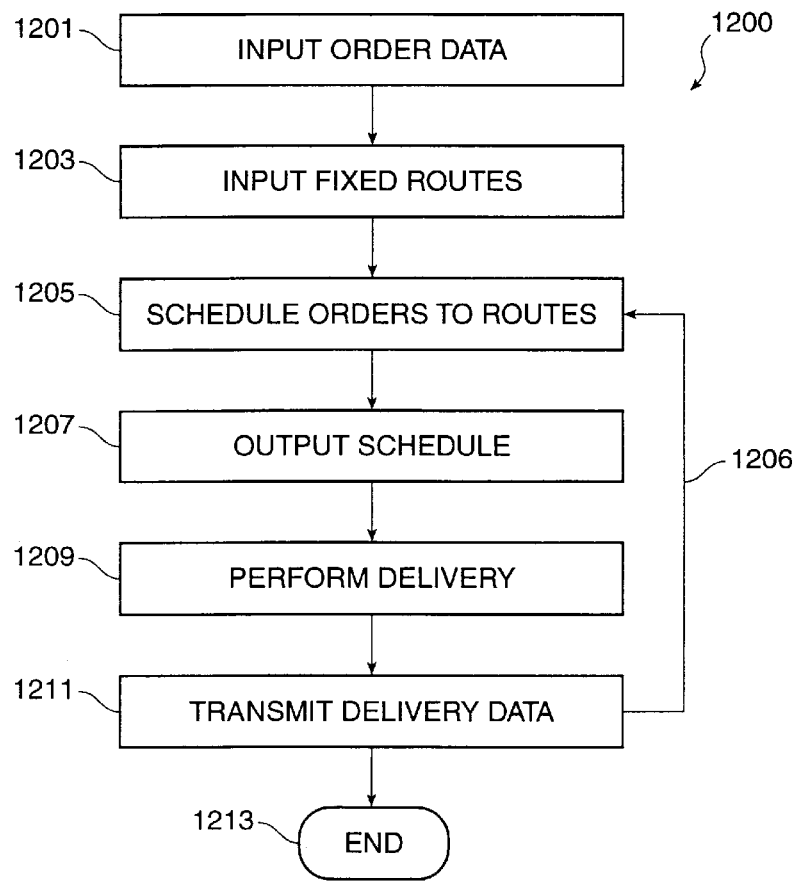
FIG. 12 is a simplified flow diagram of a schedule selection method according to the present invention.

FIG. 12 is a simplified flow diagram of a scheduling method 1200 according to the present invention. The scheduling method is performed on the computer aided dispatch system as previously described, but can also be performed on other computer aided dispatch systems and the like. The scheduling method 1200 includes steps such as input order data 1201, input fixed routes 1203, schedule orders to routes 1205, output schedule 1207, perform delivery 1209, transmit delivery data 1211, and reschedule orders to routes 1205 via branch 1206, and others.

In step 1201, order data are input into memory of the computer aided dispatch system. Order data include caller information such as a caller name, a phone number, and the like. Order data also include billing data, origin data, destination data, and others. The billing data include a billing name, a billing address, a billing authorization number, and other information. The origin data include at least a contact name and a contact address. The destination data include at least a contact name and a destination. Order data also include package size and others, time information and data constraints.

The fleet includes a selected number of fleet mobile units with fixed routes (or scheduled routes). A fleet mobile unit performs pick-up and delivery based upon its fixed route typically for efficiency purposes or the like. The scheduling method inputs the fixed routes for the fleet into memory of the computer aided dispatch system in step 1203. The input step occurs by way of standard input devices such as keys, or the like. Alternatively, the fixed route can be entered via the automatic vehicle location apparatus or the like.

In step 1205, the scheduling method via a processing means schedules the order data with a fixed route to provide schedule information. In particular, the scheduling method identifies pick-up and delivery points from the order data, and correlates such pick-up and delivery points to a fixed route. Additional order data such as time constraints, order size, and other information may also be used to determine which order should be placed to the particular fixed route. The scheduling method schedules each order with a fixed route based upon the order data. Criteria for such selection process includes increasing the amount of orders per fixed route such that the cost per order decreases, or the amount of time spent on each order per route decreases. Alternatively, a criterion for such selection process includes optimizing the route based upon the order data and fixed routes. Optimization is often defined as reducing the amount of time necessary between the pick-up and delivery of the order, and increasing the amount of profit for the fixed route or routes as a whole. The schedule information is stored into memory of the computer aided dispatch system, and the like. Of course, other selection criteria and optimization schemes may be used depending upon the particular application.

The scheduling method outputs the schedule information including the schedule with order and corresponding route in step 1207. In particular, the scheduling method retrieves from memory the schedule information and outputs such schedule information to an output device. The output device includes a device such as a line printer, a ticket from a line printer, a screen display, a pager, and others. The output device can be located at, for example, a dispatcher, a fleet mobile unit, or the like. The dispatcher forwards the schedule information to the selected fleet mobile unit with the fixed route. Alternatively, the fleet mobile unit receives the schedule information directly via output device or the like.

The fleet mobile unit performs the instructions on the schedule information for its scheduled orders in step 1209. Upon pick-up of the order the fleet mobile unit transmits (step 1211) pick-up information to the dispatch station or the like. The dispatch station receives the pick-up information and updates the computer aided dispatch system which reflects (or outputs) such changes on, for example, a display screen or the like. The fleet mobile unit periodically transmits time and location information to the computer aided dispatch system via automatic vehicle tracking system. Upon delivery of the order, the fleet mobile unit transmits delivery information to the dispatch station or the like. The dispatch station receives the delivery information and updates the computer aided dispatch system, which reflects such changes on for example memory and a display screen or the like.

By way of branch 1206, the scheduling method reschedules orders and re-routes the fleet mobile unit in step 1205. In particular, the scheduling method via processor reschedules the route and orders for the fleet mobile unit based upon additional information including the pick-up information, delivery information, and time and vehicle location information from step 1211. The re-scheduled information is output (step 1207), the re-scheduled orders are delivered (step 1209), and pick-up and delivery information are re-transmitted to the dispatch station via branch 1206.

Upon completion of the fixed route, the fleet mobile unit returns to homebase, and the scheduling method provides new schedule information to the fleet mobile unit. The fleet mobile unit traverses the fixed route based upon a time criterion such as a half day route, a daily route, a weekly route, or the like. The fleet mobile unit can also traverse the route based upon an alternative criteria. Of course, the particular fixed route traversed at a selected time depends upon the particular application.

Figure 13:
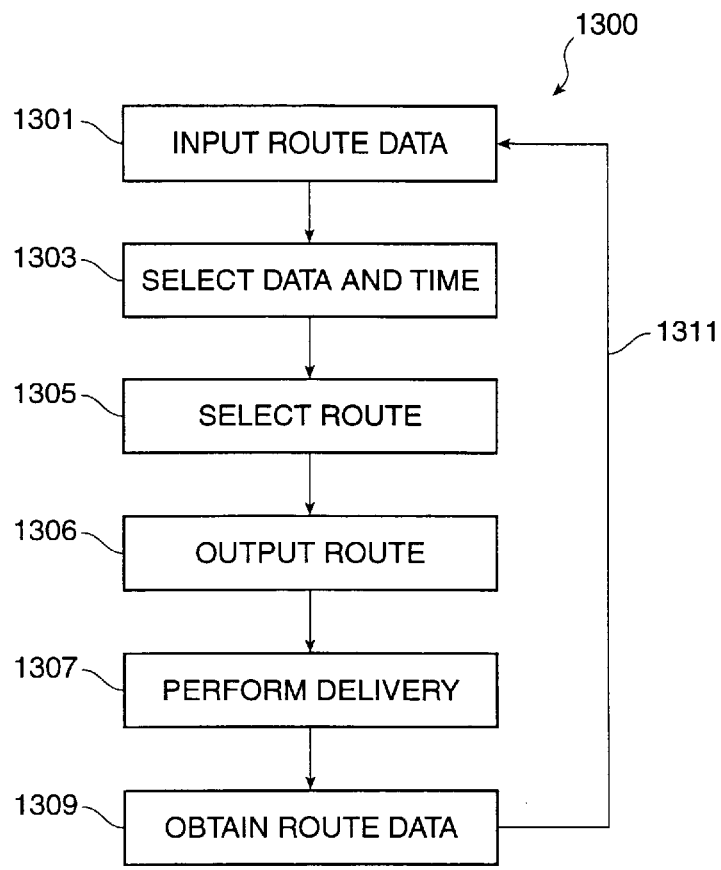
FIG. 13 is a simplified flow diagram of a route selection method according to the present invention.

FIG. 13 is a simplified flow diagram 1300 of a route selection method according to the present invention. The route selection method is performed on the computer aided dispatch system as previously described, but can also be performed on other computer aided dispatch systems and the like. The route selection method includes steps such as input route data 1301, select data and time 1303, select route 1305, output selected route 1306, perform delivery 1307, obtain route data 1309, and re-input route data via branch 1311, and others. The route selection method provides a selected route which improves at least delivery times for orders, and reduces costs related to such orders.

In step 1301, route data are input into memory of the computer aided dispatch system. The route data includes geographical locations of fixed routes, but also includes alternative routes. The route data further includes fleet mobile unit information such as vehicle types, history of traffic conditions for each of the fixed routes depending upon the time of year and other factors, and other information. A history of traffic conditions for the alternative routes are also input into the memory of the computer aided dispatch system.

The route selection method requires a time on a date (step 1303) for an order. The order generally includes a separate time on a date for pick-up and delivery, and additional information such as a pick-up location and a delivery location. The time and date can be supplied by a key input, or directly supplied via on-board clock on the computer aided dispatch system to the route selection method. The pick-up and delivery locations can be supplied by any of the previous embodiments, as well as other techniques.

Based upon the times, dates, and pick-up and delivery locations, the route selection method chooses (step 1305) a route for the order(s). In particular, the route selection method scans the history of selected routes including fixed and alternative routes, and determines which fixed route (or alternative route) has less stops and traffic congestion based upon the historical data at a selected time. For example, a particular route may be subject to traffic congestion at a selected time of day or even a selected day in the year based upon events such as people commuting to work, people driving to a sporting event on a holiday, people driving to a major shopping center during Christmas time, or the like.

In step 1306, the route selection method outputs a route to an output device. The output device can be a printer, a display, a memory, or any other means capable of reading the route. The output device can be at, for example, the dispatch location, a mobile unit location, or any other location. The route can also become the fixed route defined in step 1203 of the previous embodiment.

Based upon the route, the fleet mobile unit performs pick-up and delivery of the order(s) in step 1307. The delivery takes place upon the selected day and time for the particular pick-up location and destination. As the fleet mobile unit performs the pick-up and delivery, traffic information such as times, stops, and vehicle congestion is obtained via step 1309. The traffic information is fed back into the route selection method via branch 1311 to the input route data step 1301. Accordingly, the route selection method continuously updates its database of historical route data upon each pick-up and delivery. The route selection method selects the same or different routes based upon the updated route database and selected date and time in step 1303. By way of steps 1301 through 1309 via branch 1311, the route selection method provides an improved technique for route selection with each iteration through branch 1311.

Figure 14:
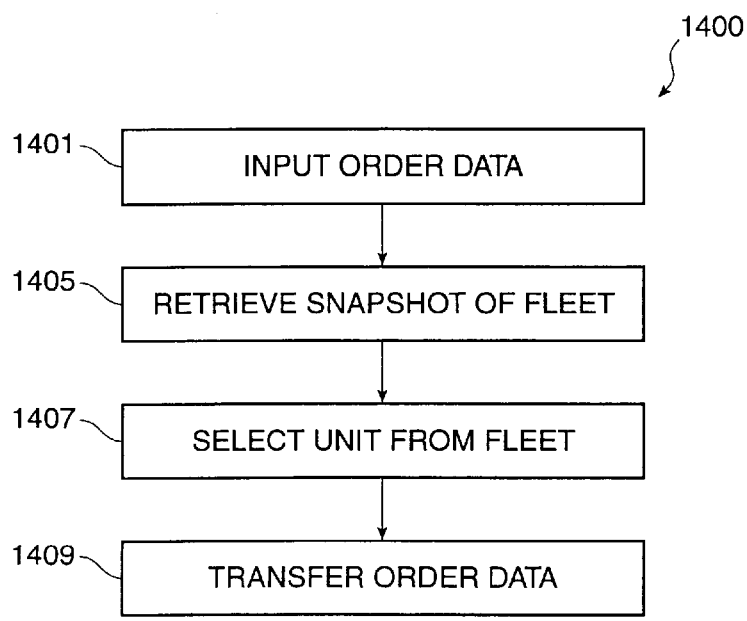
FIG. 14 is a simplified flow diagram of an on-line dispatching method according to the present invention.

FIG. 14 is a simplified flow diagram of an on-line dispatching method 1400 according to the present invention. The on-line dispatching method is performed on the computer aided dispatch system as previously described, but can also be performed on other computer aided dispatch systems and the like. The on-line dispatching method includes steps such as input order data 1401, retrieve snap-shot of fleet 1405, select unit from fleet 1407, transfer order data 1409, and others.

The on-line dispatching method provides real time dispatching (or in-situ dispatching) based upon the order and status of the fleet mobile units. As an example, the on-line dispatching method allows a customer to place an order via phone or other telecommunication device to the computer aided dispatching system, and the computer aided dispatching system transfers the order by way of two-way messaging or the like to the selected fleet mobile unit. The fleet mobile unit picks up the order and delivers the order to its delivery point. Pick-up and deliver can occur on the same day, or within the same period of day, or even the same hour and less. In preferred embodiments, the order can be picked up and delivered within a half an hour or less, or more preferably ten minutes and less.

The on-line dispatching method includes steps of receiving from a customer and inputting order data (step 1401). The order data include a pick-up time, a delivery time, a pick-up location, a delivery location, and other information. The on-line dispatching method often occurs at, for example, the dispatch station or the like. The on-line dispatching method goes from the customer to the computer aided dispatch system, and then to the fleet mobile unit.

In step 1405, the on-line dispatching method retrieves a "snap-shot" status of the fleet mobile units. The "snap-shot" status can include information such as the aforementioned data in Table 1. In addition, the snap-shot status also includes a time, a vehicle location, a vehicle direction, and other information. The snap shot status is retrieved via the automatic vehicle location system, two-way massaging system, and other system elements. The snap shot status is stored into memory of the computer aided dispatch system.

The on-line dispatching method via processor identifies a fleet mobile unit (step 1407) from the "snap-shot" data which can pick up and deliver the order within the parameters of the order data. For example, the order data requires a pick-up and delivery location to be in the downtown location. A fleet mobile unit at, for example, a downtown location would be the preferred candidate for pick-up and delivery of the order for the downtown location. Alternatively, a fleet mobile unit closest to the pick-up location and heading into the pick-up location would be a preferred candidate for the order. Alternatively, a fleet mobile unit without any orders, and near the pick-up location and heading toward the pick-up location would be the preferred candidate for the order. Of course, other parameters can also be used for selecting the fleet mobile unit depending upon the particular application.

Upon completion of the step 1409, the on-line dispatching method transfers selected order data to the selected fleet mobile unit. The order data may be transferred via the two-way messaging system, or the computer aided dispatch system, or the like. The fleet mobile unit receives the selected order data and performs the pick-up and delivery of the order within the specified time limits. Data corresponding to the pick-up and delivery are transferred via the automatic vehicle location system to the computer aided dispatch system or the like.

In summary, a novel technique has been described for combining raster and vector information. While the invention has been described with reference to the illustrated embodiment, this description is not intended to be construed in a limiting sense. Various modifications of the illustrated embodiment as well as other embodiments of the invention will become apparent to those persons skilled in the art upon reference to this description. For example, instead of specifying vehicle position as related to a coordinate system dependent on latitude and longitude, vehicle position can be specified as a function of an x, y, z coordinate system. It will be understood, therefore that the invention is defined not by the above description, but by the appended claims.

What is claimed is:

1. An integrated fleet management system, said system comprising:

a database comprising a raster database portion and a vector database portion;

a computer aided dispatch system coupled to said database, said computer aided dispatch system being capable of receiving mobile information from a mobile unit; and a mobile data terminal coupled to said computer aided dispatch system, said mobile data terminal being capable of transferring said mobile information from said mobile unit to said computer aided dispatch system.

2. The system of claim 1 further comprising a display coupled to said computer aided dispatch system, said display comprising a user locatable mark to identify a location of said mobile unit.

3. The system of claim 2 wherein said display further comprises a first portion, said first portion including a raster map.

4. The system of claim 2 wherein said display further comprises a second portion, said second portion including vector information.

5. A fleet management system comprising:

a database comprising a raster database portion and a vector database portion;

a computer aided dispatch station for receiving and transferring vehicle information; and a mobile data terminal coupled to said computer aided dispatch station, said mobile data terminal comprising a microprocessor-controlled circuit coupled to a mobile radio modem, said mobile data terminal being adapted to transmit information in the form of data to said computer aided dispatch station.

6. The system of claim 5 wherein said mobile data terminal is coupled to a global positioning sensor, said global positioning sensor being adapted to provide vehicle location information to said computer aided dispatch station through said mobile data terminal.

7. The system of claim 5 wherein said computer aided dispatch station transfers order information in the form of data to said mobile data terminal.

8. The system of claim 5 further comprising an output device coupled to said computer aided dispatch station.

* * * * *